(12) United States Patent
Nguyen

(10) Patent No.: US 9,915,853 B2
(45) Date of Patent: Mar. 13, 2018

(54) OPTICAL PARAMETRIC OSCILLATOR WITH FAST TUNING

(71) Applicant: Lam Khanh Nguyen, Oceanside, CA (US)

(72) Inventor: Lam Khanh Nguyen, Oceanside, CA (US)

( * ) Notice: Subject to any disclaimer, the term of this patent is extended or adjusted under 35 U.S.C. 154(b) by 0 days.

(21) Appl. No.: 14/756,711

(22) Filed: Oct. 2, 2015

(65) Prior Publication Data
US 2017/0176839 A1    Jun. 22, 2017

Related U.S. Application Data

(60) Provisional application No. 62/060,950, filed on Oct. 7, 2014.

(51) Int. Cl.
| | |
|---|---|
| G02F 1/39 | (2006.01) |
| G02F 1/35 | (2006.01) |
| G02F 1/355 | (2006.01) |
| H02P 25/06 | (2016.01) |

(52) U.S. Cl.
CPC .............. G02F 1/39 (2013.01); G02F 1/3501 (2013.01); G02F 1/3551 (2013.01); *G02F 2001/3503* (2013.01); *G02F 2001/3505* (2013.01); *G02F 2001/3507* (2013.01); *G02F 2001/3546* (2013.01); *H02P 25/06* (2013.01)

(58) Field of Classification Search
CPC .... G02F 1/3501; G02F 1/39; G02F 2001/392; H02K 41/0354; H02P 25/06
See application file for complete search history.

(56) References Cited

U.S. PATENT DOCUMENTS

| | | | | |
|---|---|---|---|---|
| 3,962,576 A | * | 6/1976 | Kuhl | G02F 1/37 |
| | | | | 250/201.9 |
| 5,276,548 A | * | 1/1994 | Margalith | G02F 1/39 |
| | | | | 359/330 |
| 6,295,160 B1 | * | 9/2001 | Zhang | G02F 1/39 |
| | | | | 359/330 |
| 8,542,435 B2 | * | 9/2013 | Raybaut | G02F 1/3544 |
| | | | | 359/330 |
| 9,482,928 B2 | * | 11/2016 | Perkins | G02F 1/353 |
| 2015/0185077 A1 | * | 7/2015 | Malcolm | G02F 1/3532 |
| | | | | 356/402 |
| 2016/0294154 A1 | * | 10/2016 | Tanaka | G02F 1/353 |

\* cited by examiner

*Primary Examiner* — Daniel Petkovsek
(74) *Attorney, Agent, or Firm* — John R. Ross; John R. Ross, III

(57) ABSTRACT

An OPO with very fast and accurate tuning. The angle of the crystals in the OPO is controlled by converting the linear motion of a voice coil into rotational motion. In preferred embodiments one or two OPO crystals are mounted as a crystal unit that can rotate around an axis such that the angle of the crystals with respect to the beams' direction can be varied to generate the desired wavelengths. The crystal unit has a lever that is connected to the shaft of the voice coil such that as the shaft extend or retracts the level is pulled or pushed and the linear motion of the shaft is converted to an angular motion of the crystal unit. The position of the voice-coil shaft is controlled in a close-loop based on a built-in encoder. The relation between the reading of the encoder and the crystals' angle is recorded and provides the calibration of the unit. Preferably calibration is done by measuring the output wavelength of the OPO as a function of the encoder position.

13 Claims, 4 Drawing Sheets

OPTICAL PARAMETRIC OSCILLATOR WITH FAST TUNING

CROSS REFERENCE TO RELATED APPLICATIONS

This application claims the benefit of Provisional Patent Application Ser. No. 62/060,950, filed 7 Oct. 2014.

FIELD OF THE INVENTION

The present invention relates to the general art of Optical Parametric Oscillators and other non-linear optical frequency conversion systems, and in particular to such systems designed for fast switching between wavelengths.

BACKGROUND OF THE INVENTION

An Optical Parametric Oscillator (OPO) is a device employing one or more non-linear crystals which when pumped by a laser beam defining a pump wavelength, can generate coherent light at two different and longer wavelengths. In the OPO at least one non-linear crystal (such as $BaB_2O_4$, $LiB_3O_5$, $LiNbO_3$, $KTiOPO_4$ and others) is placed in an optical resonator. When the pump laser beam is directed to propagate through the crystal, a pair of beams (referred to as the signal beam and the idler beam) is produced. Energy of the photons in the beams is conserved so:

$$\frac{1}{\lambda_p} = \frac{1}{\lambda_s} + \frac{1}{\lambda_i}$$

where $\lambda_p$ refers to the wavelength of the pump beam, $\lambda_s$ refers to the wavelength of the signal beam and $\lambda_i$ refers to the wavelength of the idler beam. Typically the shorter wavelength beam is referred to as the signal beam and the longer wavelength beam is referred to as the idler beam. Software is available on the Internet for selecting non-linear crystals and modeling their performance. This software is referred to as SNLO (for "Select Non-Linear Optics"). This software was developed by Dr. Arlee Smith and is available at the web site of AS Photonis with offices in Albuquerque, N. Mex.

The momentum of the photons has to be preserved as presented by the following equation:

$$\frac{n_p}{\lambda_p} = \frac{n_s}{\lambda_s} + \frac{n_i}{\lambda_i}$$

where $n_p$, $n_s$, $n_i$, are the refraction indices of the pump, signal, and Idler beams in the crystal material. The momentum equation can be solved only for birefringent crystals in which the index of refraction is not only a function of the wavelength, but it also depends on the polarization orientation of the beam with respect to the optical axis of the crystal. For a given crystal, one can easily calculate the angle between the optical axis of the crystal and the propagation direction of the pump beam that will provide a solution to the above two equations. In practice, by changing the angle between the crystal(s) and the direction of the beams one can select the desired signal wavelength and the corresponding idler.

The generation of the parametric beams (the idler and the signal) in a single path through the crystal(s) is inefficient and only a small fraction of the pump beam is converted. In order to construct an efficient and useful device the crystal(s) are typically placed inside a resonator that is designed to oscillate one or both of the parametric beams inside the cavity, such that it (or they) are amplified in successive passes through the crystal(s). The oscillator components of the OPO are typically comprised of optical elements designed to provide the required feedback for efficient conversion. The principles of OPO are well known and described in many publications on lasers and non-linear optics (for example, A. Yariv, Quantum Electronics, $3^{rd}$ edition, p. 411. John Wiley & Sons, New York). In many of these OPO's the wavelengths of the signal beam and therefore the idler beam can be tuned over a wide spectral range by varying the orientation of the crystal with respect to the laser beam, by changing the crystal's temperature, or by applying a variable voltage across the crystal. Various tuning ranges can be achieved by properly selecting the laser, the non-linear crystal, and the optical components. Ring oscillators provide high efficiency conversion. A good example is described in U.S. Pat. No. 5,216,598 issued Jan. 4, 1994.

Optical parametric oscillators (OPO's) have been recognized as critical devices for a wide range of applications. In the early stages they were used primarily for research applications and as the designs of these devices have improved they have been incorporated in instruments that are used in commercial applications. In most cases, the wavelength tuning speed, meaning the time it takes to switch from one wavelength to another, is not a major issue. However, for some applications, such as in-vivo medical Imaging and high frame rate hyper-spectral Imaging, fast tuning is critical.

Common Tuning Mechanisms

Rotation mechanisms that incorporate stepping motors, DC motors, or similar, have limited response time to a motion command. When a command is sent to the motor driver, the motor has to accelerate towards the new position and decelerate in order to stop at the new position. Typical response time is measured in a few hundred milliseconds, or even seconds depending on the angle that the motor has to rotate in order to reach the new position. The motor can be directly coupled to the OPO crystals, or via various gears.

Most commercially available OPO incorporate various motors and gears to rotate and precisely control the crystal angles. However, these mechanisms are relatively slow and take a few seconds to switch between wavelengths. This is too slow for some applications.

Voice Coils

A voice coil device consists of a coil and a magnet. Voice coils operate on the principal of the Lorentz force, which states that a current carrying conductor placed in a magnetic field will have a force exerted upon it. This force is proportional to the direction and magnitude of the current and the magnetic flux density field. The amount of force that is produced is directly proportional to the magnitude of the input current.

Voice coils designed for applications requiring short stroke and high velocity are sometimes referred to as linear positioning stages. These are ideal for short-stroke closed-loop positioning applications where precise position, velocity, and acceleration control is necessary. They can have very low electrical and mechanical time constants and can be very small in size. The low masses of the moving parts allow for high accelerations of the light payloads. An iron-less core coil assembly has no magnetic attractive force to the stationary magnet assembly, which reduces the load on the bearing system, increasing the life of the bearing. There are reduced magnetic drag forces (hysteresis), which allow for higher accelerations. These actuators are wound in such a way that no commutation is required for motion to occur. The result is a simple and reliable motion system.

Voice coils are commercially available and detailed descriptions of their operation can be easily found in text books. For example H2W Technologies with offices in Santa Clara, Calif. offers voice coils for short stroke (typically less than 2 inches) closed loop servo applications. Their compact size allows them to fit into small spaces. They have very low electrical and mechanical time constants. The low moving mass allows for high accelerations of light payloads. These actuators are wound in such a way that no commutation is required for motion to occur. Coupling the actuators with a bearing system, a position feedback device, a linear servo amplifier and a motion controller yields a system that is capable of intricate position, velocity, and acceleration control. These actuators can also be used for precise force control because of the linear force versus current characteristics.

What is needed is an OPO with very fast and accurate tuning.

SUMMARY OF THE INVENTION

The present invention provides an OPO with very fast and accurate tuning. The angle of the crystals in the OPO is controlled by converting the linear motion of a voice coil into rotational motion.

In preferred embodiments one or two OPO crystals are mounted on a rotation stage that can rotate around an axis such that the angle of the crystals with respect to the beams' direction can be varied to generate the desired wavelengths. The rotation stage has a lever that is connected to the shaft of the voice coil such that as the shaft extend or retracts the lever arm is pulled or pushed and the linear motion of the shaft is converted to an angular motion of the crystal unit. The position of the voice-coil shaft is controlled in a close-loop based on a built-in encoder. The relation between the reading of the encoder and the crystals' angle is recorded and provides the calibration of the unit. Preferably calibration is done by measuring the output wavelength of the OPO as a function of the encoder position. This procedure can be done with a simple spectrometer and performed in seconds in an automated, computer controlled operation.

Specifically embodiments of the OPO comprises: at least one non-linear crystal; a plurality of reflecting elements (defining a resonance cavity) in which a laser pump beam (defining a pump beam direction) is converted into a signal and idler beam; a rotation stage for rotating the at least one non-linear crystal with respect to the pump beam direction; a voice coil (comprising a coil, a magnet and a linear encoder) adapted to produce fast and accurate linear motion; and a link element for converting linear motion of the voice coil to angular motion of the rotation stage. The resonance cavity may be a ring cavity or a linear cavity. The link element comprises a lever arm and a hinge or a spring. In preferred embodiments two crystals are mounted on the rotation stage. In preferred embodiments the non-linear crystal or crystals are BBO crystal cut at 23 degrees for type 1 operation. In some preferred embodiments the pump beam may be a pulsed laser beam and the oscillator is designed for several oscillation of the signal beam during each pulse of the pump beam, and the ring cavity contains sufficient reflecting elements to rotate the signal beam 90 degrees during each oscillation the signal beam. This would improve the quality of the output signal beam for reasons explained in patent application Ser. Nos. 14/121,438 and 14/545,504 referred to in the detailed description. The rotation stage may include an adjustment provision for making correction to the angular orientation of one crystal with respect to the other crystal to ensure phase matching during rotation.

DETAILED DESCRIPTION OF PREFERRED EMBODIMENTS

First Preferred Embodiment

Figure 1:
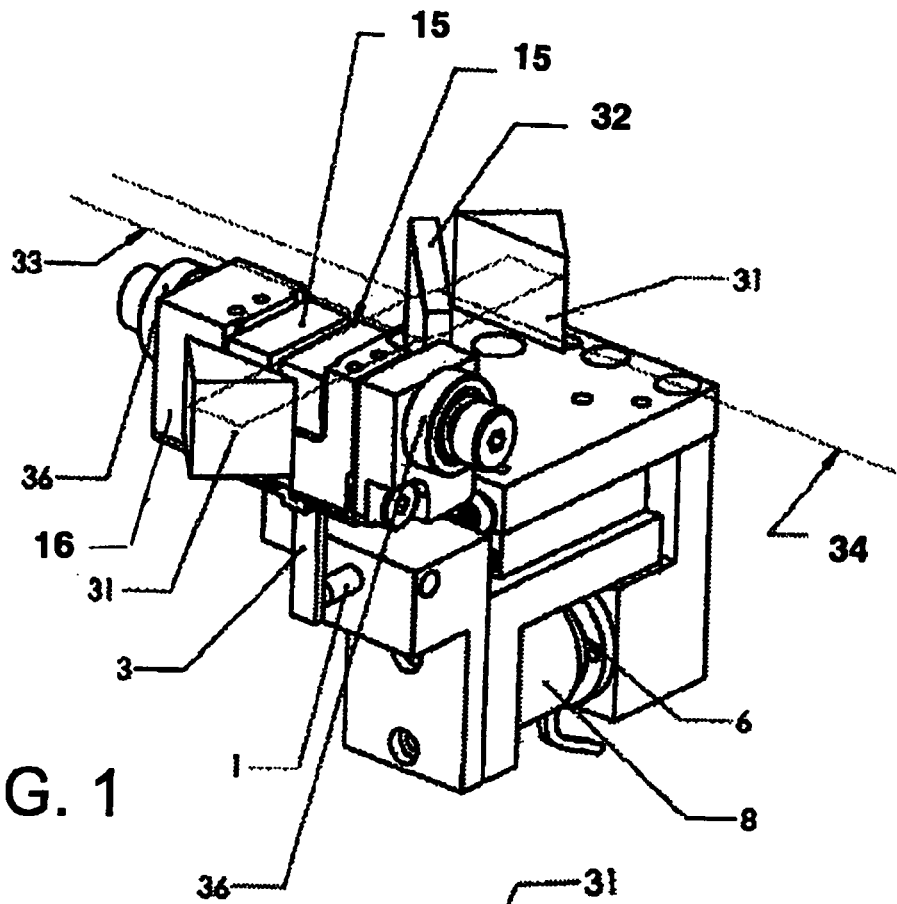
FIG. 1 is an overview drawing showing the components or a preferred voice coil tuning mechanism of a preferred embodiment of the present invention using two OPO crystals in a ring oscillator.
Figure 2:
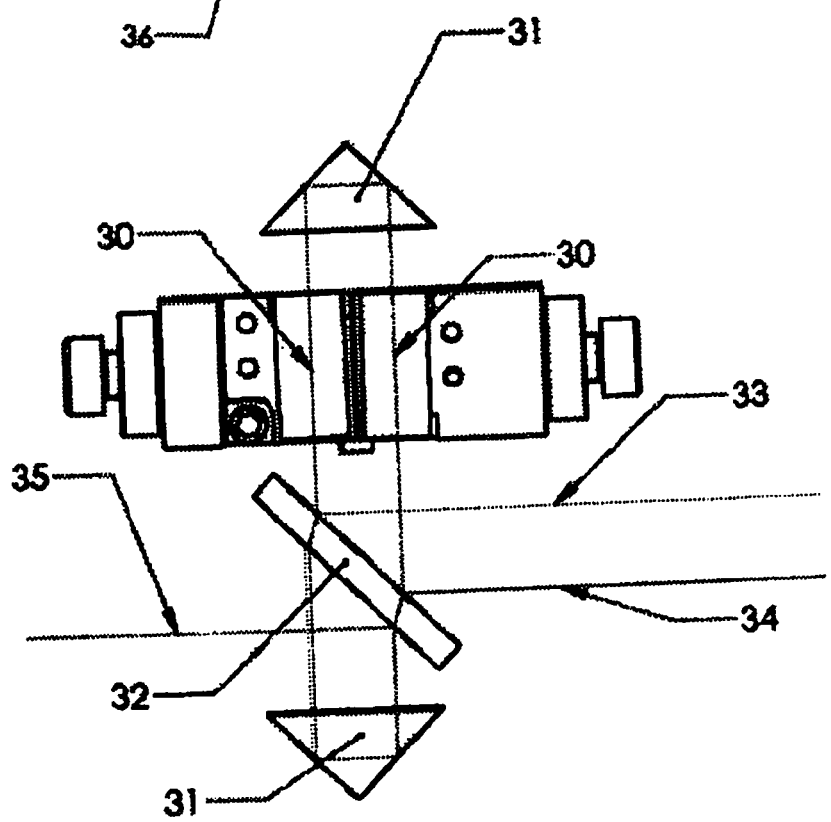
FIG. 2 is a top view of the FIG. 1 optical layout showing optical path of a preferred embodiment utilizing a ring oscillator.
Figure 4:
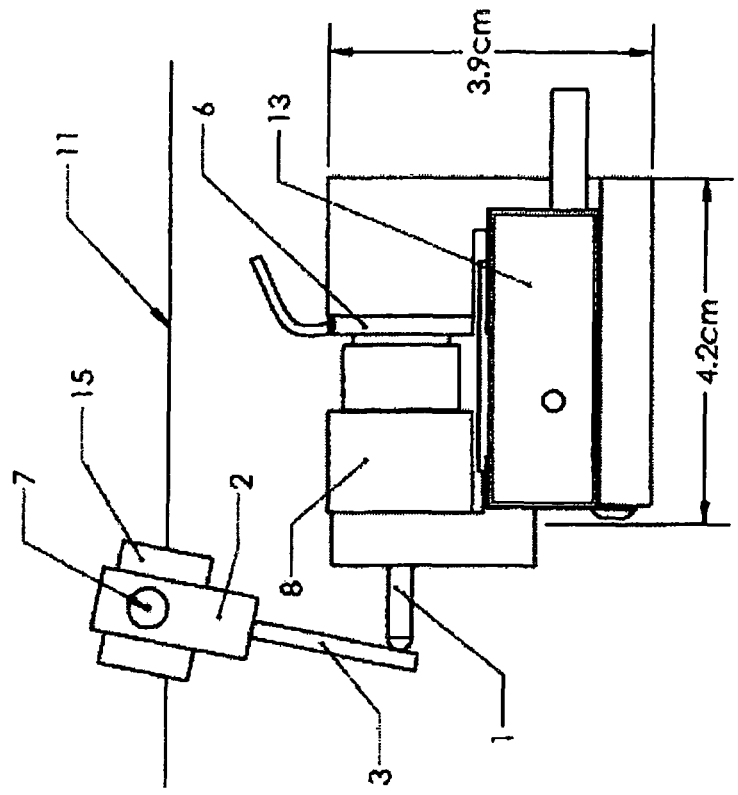
FIG. 4 is a side view of the mechanism when the voice coil is extended
Figure 3:
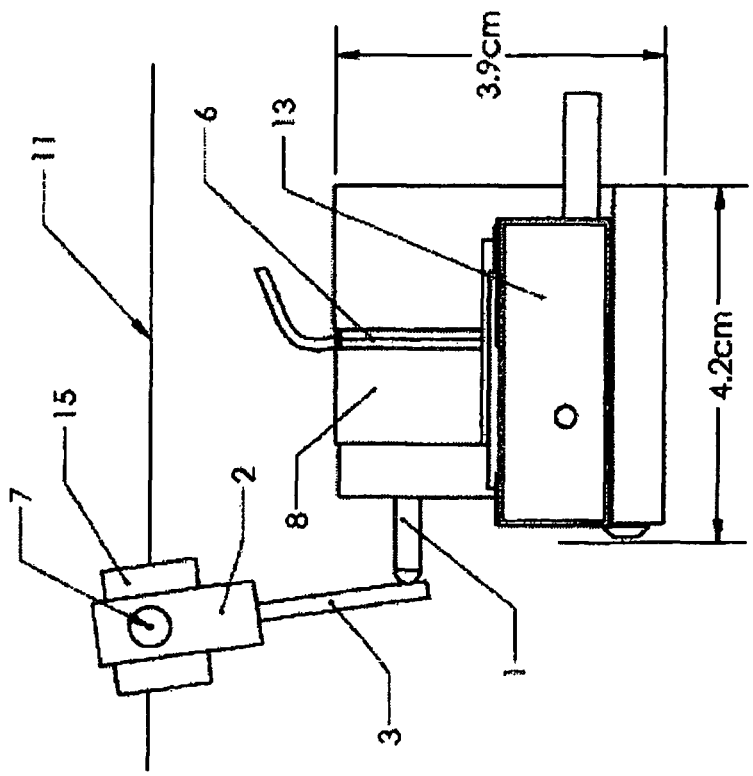
FIG. 3 is a side view of the mechanism when the voice coil is retracted.
Figure 5:
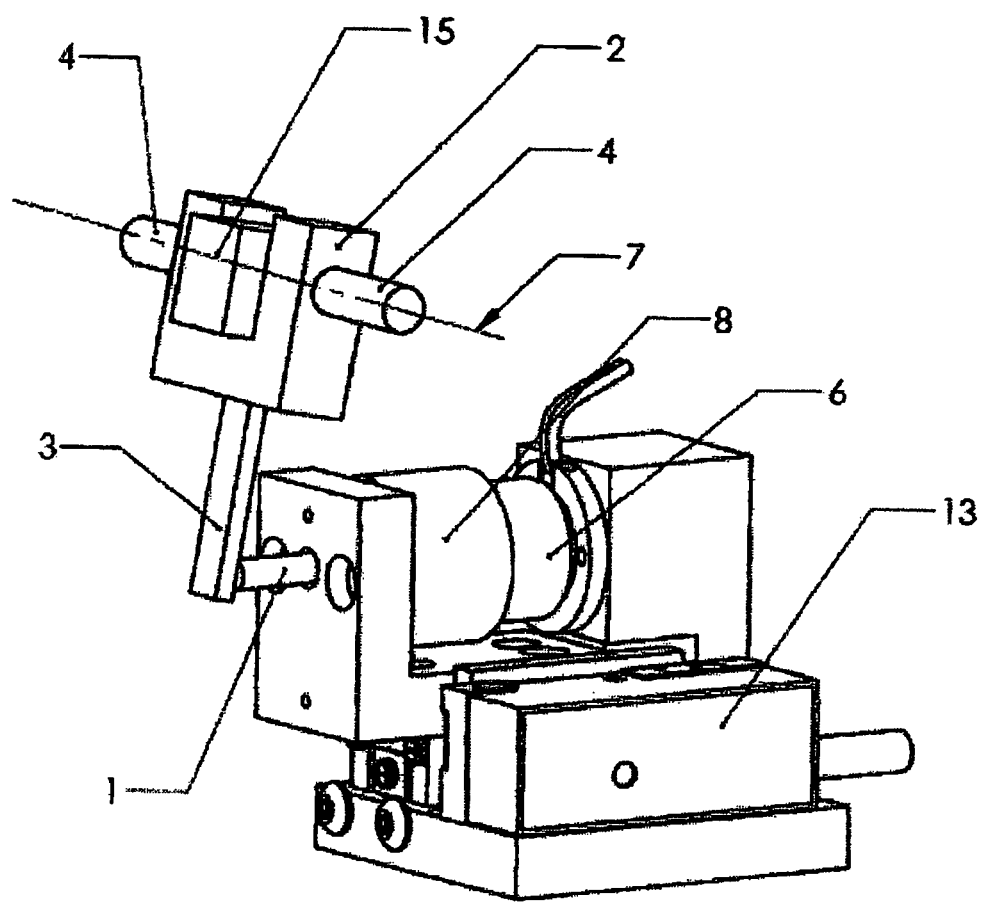
FIG. 5 is similar to FIG. 1 except only a single crystal is utilized.
Figure 6:
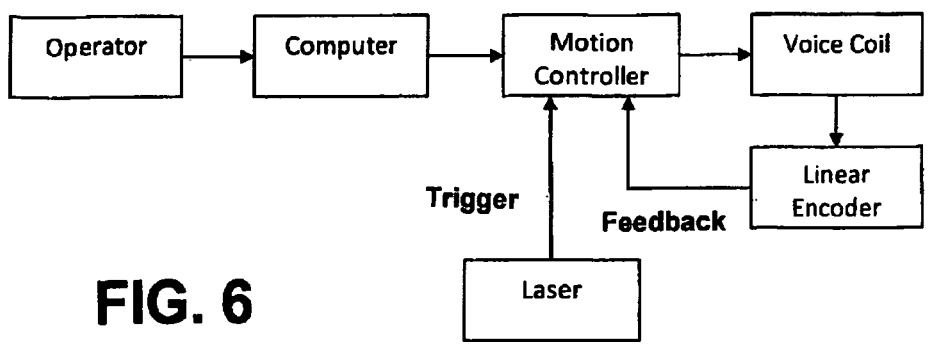
FIG. 6 is a block diagram showing the operating principal of a preferred embodiment.

A first preferred embodiment of the present invention can be described by reference to FIGS. 1 through 5. This preferred embodiment presents a ring OPO shown in FIG. 1 which incorporates two crystals of a crystal unit mounted side by side on a crystal rotation stage. The optical layout is shown in FIG. 2. Examples of ring oscillators are described in U.S. Pat. No. 5,276,548 and patent application Ser. Nos. 14/121,438 and 14/545,504, these examples are incorporated herein by reference. The preferred embodiment includes a voice coil control unit to provide very rapid control of the output frequency of the OPO. FIG. 4 is a prospective drawing of the voice coil control unit showing how the crystal rotation stage of the OPO is rotated a few degrees about an axis of the crystal rotation stage. The crystal rotation stage has two aligned crystal shafts 4 that serve to rotate the crystal unit about the axis 7. The crystal shafts 4 are preferably inserted into bearings (not shown) to provide smooth rotation motion. The crystal rotation stage incorporates a lever arm 3. The components of the voice coil include coil 6, coil shaft 1 that is attached to a magnet 8, and a linear encoder 13. When a current is applied to the coil, the magnet with the attached coil shaft will move along a linear translation stage (not shown) back and forth in accordance with the applied current, while the position of the shaft is monitored by encoder 13. The shaft is connected to the rotation stage lever arm 3 with a spring (not shown) that allows rotation of the stage with respect to the axis 7 with minimal force. (A hinge or magnetic element may be substituted for the spring.) As the magnet extends and retracts, the lever is pushed or pulled by the shaft and the crystals angle with respect to the laser beam 11 (as shown in FIGS. 3 and 4) changes accordingly. A motion controller with closed-loop feedback provides the means to precisely control the position of the shaft and therefore, the angle between optical axis of the OPO crystals 15 and the laser beam 11. The user inputs the desired wavelengths (or array of positions) to which the OPO is to be tuned. The motion controller (Model DMC-30012) available from Galil, Inc. with offices in Rocklin, Calif.) stores these positions in its memory. With each pulse of the laser, in preferred embodiments, the voice coil is moved to the next position (to change the output beam to a different wavelength). With each laser pulse, a trigger is sent from the laser to the motion controller to start the motion of the voice coil to the next position (or wavelength) in the array. The timing of the trigger relative to the laser pulse is preferably set such that the motion of the voice coil is finished before the laser pulse is fired. The signal from the linear encoder gives the feedback necessary to maintain accurate positioning. The voice coil, linear encoder, and motion controller constitute a typical servo system. The performance of the system (i.e., how fast the OPO tunes and settles at a new wavelength) depends on careful selection and adjustment of the parameters of the system, the total mass of the moving parts, and the coefficients the proportional integral controller (PID) control loop of the motion controller. A block diagram illustrating the operating principle is shown in FIG. 6.

The entire mechanism of the preferred embodiment is very small and measures about 4.2×3.9 cm as shown in FIGS. 3 and 4. The encoder resolution is 0.1 micron, and the distance between the rotation stage axis and the axis of the magnetic shaft is about 3 cm. Therefore, a 1 micron motion of the shaft results in a rotation angle of 33 microradians, or 0.002 degrees, which translates to 500 points in 1 degree. This is significantly higher resolution than is required to precisely control the output wavelength of the most demanding OPO. In example, an OPO pumped at 532 nm with a type I crystal, as used for typical photo-acoustic applications, the total angle required to cover the entire spectral range of 680 to 980 nm is about 3 degrees. The mechanism presented in this preferred embodiment can provide 1500 points for the 3 degrees of motion which corresponds to a resolution of 0.2 nanometer of the OPO wavelength. This corresponds to a resolution accuracy of about 0.24 percent. Most other OPOs have much wider tuning angles, and therefore, the resolution for these OPOs will be even higher.

The voice coil selected in for this preferred embodiment (H2W model VCS02-001-CR-001-MC) has a stroke of about 5 mm, and setting time of better than 50 milliseconds. Therefore it can be commanded to reach any angle, or OPO wavelength within the tuning range of the above type of OPO in less than 50 milliseconds. Longer strokes, and/or shorter settling times can be achieved by selecting different voice coil and controller parameters.

Applicants' Prototype

The applicants have built a prototype based on the preferred embodiment components and demonstrated switching the OPO wavelength to any wavelength in the range of 680 nm to 980 nm, every pulse, for a system that operated at 20 Hz. The sequence of consecutive wavelengths can be chosen to meet any desired requirements with no limitation on the wavelength spacing between the pulses. The mechanism was integrated with a ring oscillator OPO based on the design generally described in U.S. Pat. No. 5,276,548. The Ring Oscillator OPO is presented schematically in FIGS. 1 and 2. A pump beam 34 is reflected into the OPO cavity by a beam splitter 32. The pump beam passes through the two non linear crystals 15 and is reflected out of the cavity by the same beam splitter 32. The OPO beam, generated in the crystals, follows the same direction as the pump beam and rotates (counterclockwise in the drawing) between the two right angle prisms 31 that form the oscillator. The prisms reflect all the OPO wavelengths by total internal reflection. The output beam of the OPO is reflected out of the cavity by the backside of the beam splitter 32 that serves as the output coupler. The assembly of this OPO with the fast tuning mechanism is presented in FIGS. 3, 4 and 5. The two crystals 15 are mounted side by side on a holder 16, which is supported by two bearings 36 on each side. The holder 16 serves as a rotation stage allowing control of the angle between the optical axis of the OPO crystals and the pump beam. The crystal holder has a lever 3, which is pushed or pulled by the voice coil shaft 1 as shown in FIG. 3 and FIG. 1. In the prototype the OPO was pumped at 532 nm and was operated in the wavelength range of 680-970 nm. The laser was pulsed at 20 Hz and the output wavelength of each OPO pulse was monitored with a spectrograph in real time. A set of 5 wavelengths in the range was preset in the control computer and the OPO was commanded to switch between these wavelengths at every other pulse. It was demonstrated that the OPO tuned in the 50 ms time interval between the pulses to any wavelength with excellent accuracy and reproducibility. The sequence of consecutive wavelengths can be chosen to meet any desired requirements with no limitation on the wavelength spacing between the pulses.

Figure 7:
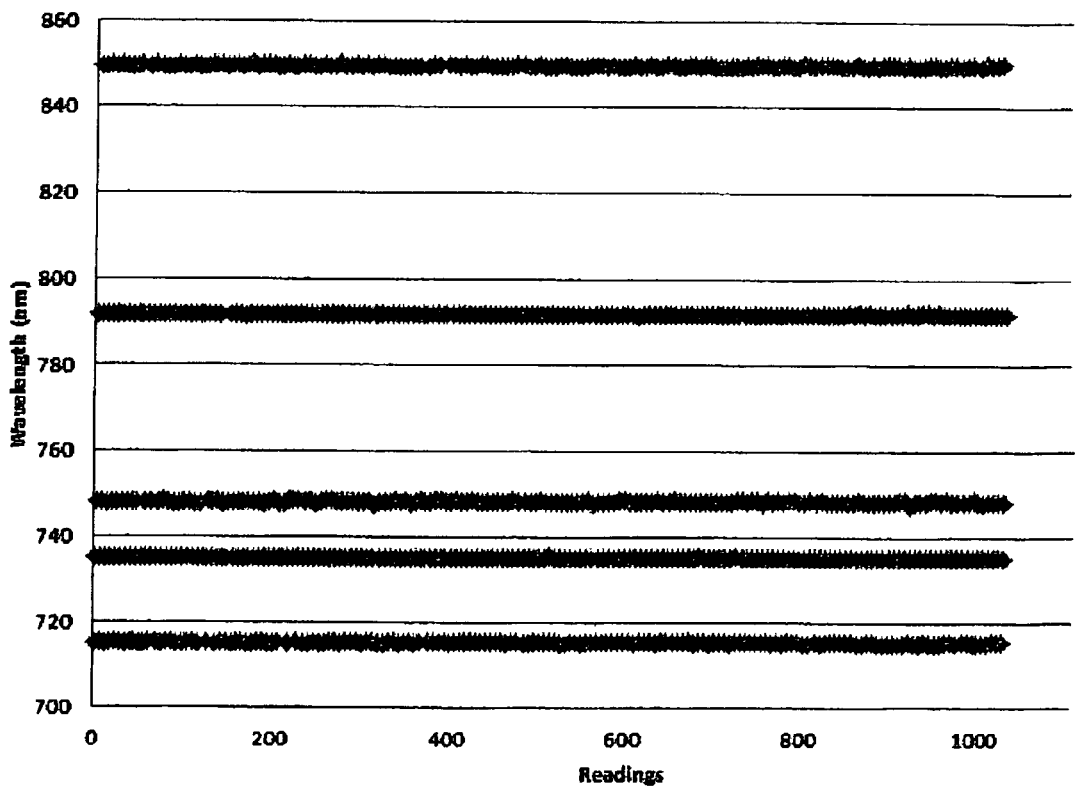
FIG. 7 shows spectrometer results of a first test of a prototype embodiment of the present invention.

FIG. 7 shows the results of the first spectrometer test of a prototype OPO actually built and tested by Applicants. One of the Applicants programmed the OPO to alternate between five selected wavelengths (715 nm, 735 nm, 793 nm, 748 nm and 850 nm). FIG. 7 is a copy of the spectrometer recording of the results of a few more than 1,000 pulses (a few more than 200 for each wavelength. During the test the pump laser was operating at a pulse rate of 20 Hz.

The Voice-Coil tuning mechanism is not limited to the ring oscillator in the demonstration and it can be applied to any OPO design.

Examples of Applications that Require Fast Wavelength Tuning

Photoacoustic Imaging

Photoacoustic Imaging is a medical imaging technique in which a short laser pulse is used to illuminate a biological subject. The laser beam of specific wavelength range penetrates the subject generating an acoustic wave. The intensity of the acoustic wave depends on the wavelength of the laser and absorption of the target. The acoustic wave is detected by an array of detectors to form an image of the target. The image is similar to an ultrasound image. However, the photoacoustic image contains information regarding the functionality of the target, which cannot be obtained from an ultrasound image. Commercial Photoacoustic Imaging Systems are available for preclinical applications, by companies such as Fuji Film, Endra, and iThera Medical, whereas clinical systems are being developed by major manufacturers of medical devices. The wide wavelength ranges that can be produced by lasers systems that incorporate Optical Parametric Oscillators (OPO) makes them ideal for this application.

The crystal rotation angle depends on desired output wavelength range, the pump wavelength, and the type of the OPO crystal. For example, the tuning range desired for Photoacoustic imaging is approximately 680 to 970 nm. The most effective OPO for this application incorporates a BBO crystal cut at about 23 deg for type I operation. In order to cover the entire wavelength range the crystal has to be rotated about 3 degrees. The desired tuning speed or the time to switch between wavelengths depends on the application and the pulse repetition rate of the laser. If the laser operates at 20 Hz, which is a typical operational mode for high energy OPO, the time between pulses is 50 ms.

One of the most attractive modality of photoacoustic is the ability of measuring the Hemoglobin concentration and the oxygen saturation in blood, in vivo. The absorption of fully oxygenated Hemoglobin and that of fully deoxygenated Hemoglobin as a function of wavelength in the infrared are well known, and by measuring the absorption of IR light at two wavelength one can calculate the above mentioned parameters. To obtain reliable data in Vivo the OPO has to switch between two wavelengths, e.g. 750 nm and 850 nm very fast. The novel tuning technique presented in this invention allows switching the wavelength to any desired wavelength within the OPO range every other laser pulse. For the specific case discussed above, switching between any two wavelengths is done in less than 50 ms.

HyperSpectral Imaging

Hyperspectral Imaging, also known as Chemical Imaging is a technique in which an array of detectors (a camera) is used to record the spectral response across a target. By analyzing the spectral information at each pixel of the camera, the components of the target can be identified. These systems are being used in a wide range of applications, in Pharmaceutical, Food, and agriculture, for quality control, identifications of poisons and fraudulent ingredients and more.

Hyperspectral device which incorporate an OPO as the illumination source is described in U.S. Pat. Nos. 7,233,392 and 8,687,055). The OPO is set to scan over a very wide range of wavelength, and is synchronized with the camera, which records a set of frames each at a different wavelength. In order to acquire images at high frame rate the OPO has to switch between wavelengths at a very high speed.

Other Applications

Applications based on differential absorption, in which two wavelengths are used to investigate presence and concentration of a constituent in the atmosphere (e.g. ozone detection in the upper atmosphere) requires fast wavelength switching. Since the air mass is moving fast wavelength switching is required in order to meaningful data.

Variations

Persons skilled in this art will recognize that many variation of and additions to the specific design described in detail above are possible utilizing the novel concepts of the present invention. For example as shown in FIG. 5 the rotation stage could include only a single crystal as is the case for linear OPOs. In a ring configuration the laser beam would preferably be directed to pass back through the same single crystal with optics such as the right angle prism 31 shown at the top of FIG. 2 instead of being directed through a second crystal as shown in FIG. 2.

Therefore the scope of the present invention should be determined by the appended claims and not by the examples that have been given.

What is claimed is:

1. An optical parametric oscillator with voice coil tuning comprising:
   A) at least one non-linear crystal mounted on a rotation stage,
   B) a pulse laser operating at a pulse rate equal to or greater than 20 Hz to produce a laser pump beam and a plurality of reflecting elements; defining a resonance cavity in which the laser pump beam, defining a pump beam direction, is converted into a signal and idler beam,
   C) a rotation stage for rotating the at least one non-linear crystal with respect to the pump beam direction,
   D) a voice coil, comprising a coil and a magnet, adapted to produce linear motion permitting changes in OPO wavelength, including settling time, in less than 50 milliseconds,
   E) an encoder to provide measurement of the position of the magnet or the coil,
   F) a feedback control loop to control the motion of the voice coil by using the position information provided by the encoder and
   G) a link element for converting linear motion of the voice coil to angular motion of the rotation stage.

2. The optical parametric oscillator as in claim 1 wherein the magnet is a moving component.

3. The optical parametric oscillator as in claim 1 wherein the coil is a moving component.

4. The optical parametric oscillator as in claim 1 wherein the voice coil also comprises a shaft and the link element includes a lever arm and an element providing a link between the lever arm and the shaft.

5. The optical parametric oscillator as in claim 1 wherein the flexible element is a spring.

6. The optical parametric oscillator as in claim 5 wherein the rotation stage has an adjustment provision for making correction to the angular orientation of one crystal with respect to the other crystal to ensure phase matching during rotation.

7. The optical parametric oscillator as in claim 1 wherein the flexible element is a hinge.

8. The optical parametric oscillator as in claim 1 wherein the resonance cavity is a ring cavity.

9. The optical parametric oscillator as in claim 1 wherein the resonance cavity is a linear cavity.

10. The optical parametric oscillator as in claim 1 wherein the at least one non-linear crystal is two non-linear crystals.

11. The optical parametric oscillator as in claim 1 wherein at least one non-linear crystal is a BBO crystal cut at about 23 degrees for type 1 operation.

12. The optical parametric oscillator as in claim 1 wherein at least one non-linear crystal is two BBO crystals each cut at about 23 degrees for type 1 operation and mounted on the same rotation stage.

13. The optical parametric oscillator as in claim 1 wherein the voice coil has a stroke of at least 5 millimeters.

* * * * *